(12) United States Patent
Scarpitti

(10) Patent No.: US 6,966,351 B2
(45) Date of Patent: Nov. 22, 2005

(54) TIRE BEAD CONFIGURATION

(75) Inventor: Anthony John Scarpitti, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/667,536

(22) Filed: Sep. 22, 2003

(65) Prior Publication Data

US 2005/0061414 A1    Mar. 24, 2005

(51) Int. Cl.$^7$ .................. B60C 15/00; B60C 15/04; B60C 15/05
(52) U.S. Cl. ............. 152/540; 152/545; 152/550; 152/552
(58) Field of Search ................ 152/540, 542, 152/545, 550, 551, 552

(56) References Cited

U.S. PATENT DOCUMENTS

| | | | |
|---|---|---|---|
| 2,966,933 A | | 1/1961 | Boussu et al. |
| 3,111,976 A | * | 11/1963 | Delobelle ............... 152/545 X |
| 3,301,303 A | * | 1/1967 | Travers .................. 152/545 |
| 3,935,894 A | | 2/1976 | Pouilloux |
| 4,277,295 A | | 7/1981 | Schmidt et al. |
| 4,811,772 A | | 3/1989 | Janus |
| 4,967,821 A | * | 11/1990 | Holroyd et al. ......... 152/540 |
| 5,660,656 A | | 8/1997 | Herbelleauu et al. |
| 5,702,548 A | | 12/1997 | Arnaud et al. |
| 5,885,387 A | | 3/1999 | Ueyoko |
| 6,135,184 A | | 10/2000 | Fyfe |
| 6,378,585 B1 | * | 4/2002 | Saeki ..................... 152/540 |
| 6,523,591 B1 | | 2/2003 | Billieres et al. |
| 6,598,642 B1 | | 7/2003 | Hirai |
| 2002/0124935 A1 | | 9/2002 | Caretta |
| 2002/0189737 A1 | | 12/2002 | Caretta |

FOREIGN PATENT DOCUMENTS

| | | | | |
|---|---|---|---|---|
| FR | 1.327.810 | * | 4/1963 | ......... 152/545 |
| GB | 320535 | | 10/1929 | |
| GB | 393312 | | 6/1933 | |
| JP | 2002067629 A | * | 3/2002 | |
| JP | 200498826 | | 4/2004 | |
| KR | 2002092667 A | * | 12/2002 | |
| WO | 0230690 | | 4/2002 | |

* cited by examiner

Primary Examiner—Adrienne C. Johnstone
(74) Attorney, Agent, or Firm—Nancy T. Krawczyk

(57) ABSTRACT

A pneumatic tire has a compact bead configuration, and high interlocking forces between the carcass ply cords and the bead cords. The carcass ply is formed from one or more cords wound continuously between a first end and a second end, wherein the at least the first end of the carcass ply is located in one tire bead portions. In the bead portion of the tire, the carcass ply cords are interwoven among a plurality of bead wires. The interwoven carcass ply cords follow a zigzag path.

12 Claims, 3 Drawing Sheets

TIRE BEAD CONFIGURATION

FIELD OF THE INVENTION

The present invention is directed to a pneumatic tire. More specifically, the invention is directed to a bead construction for a pneumatic tire wherein the carcass cord is interwoven with bead core wires to secure the radially inner end of the carcass cords.

BACKGROUND OF THE INVENTION

Historically, the pneumatic tire has been fabricated as a laminate structure of generally toroidal shape having beads, a tread, belt reinforcement, and a carcass. The tire is made of rubber, fabric, and steel. The manufacturing technologies employed for the most part involved assembling the many tire components from flat strips or sheets of material. Each component is placed on a building drum and cut to length such that the ends of the component meet or overlap creating a splice.

In the first stage of assembly the prior art carcass will normally include one or more plies, and a pair of sidewalls, a pair of apexes, an innerliner (for a tubeless tire), a pair of chafers and perhaps a pair of gum shoulder strips. Annular bead cores can be added during this first stage of tire building and the plies can be turned around the bead cores to form the ply turnups. Additional components may be used or even replace some of those mentioned above.

This intermediate article of manufacture would be cylindrically formed at this point in the first stage of assembly. The cylindrical carcass is then expanded into a toroidal shape after completion of the first stage of tire building. Reinforcing belts in the tread are added to this intermediate article during a second stage of tire manufacture, which can occur using the same building drum or work station.

This form of manufacturing a tire from flat components that are then formed toroidially limits the ability of the tire to be produced in a most uniform fashion.

In U.S. Pat. No. 3,935,894, issued Feb. 3, 1976, Jacques Pouilloux indicated that carcass plies could be laid in hoops or arcs having the ends of the carcass cord plies extending in a circumferential direction. It was his objective that a tire made this way could be dispensed of any circular bead core in the beads and the carcass would not have any lateral parts turned up radially with the edges delimited by cut cables. Others have also described constructing the ply using hoops of circular arcs so that the individual ply cords are laid across the convex toroidal cross section in its early stage of manufacture as opposed to being made in the flat construction.

One of the outstanding issues has been how to secure the radially inner end of the carcass cord plies, while also achieving a high force in the lower region of the tire to properly seat and retain the tire upon the wheel rim. The prior art teaches placing the cord ends adjacent vertically oriented and aligned columns of bead wires. The bead wires may be calendered to form a bead sheet.

SUMMARY OF THE INVENTION

The present invention is directed toward a pneumatic tire having an improved bead portion configuration characterized by a compact bead configuration, and greater interlocking between the carcass ply cords and the bead cords.

The present invention is directed to a pneumatic tire comprising a reinforcing carcass ply and opposing bead portions, the carcass ply comprising one or more cords wound continuously between a first end and a second end, wherein the first end of the carcass ply is located in one of the opposing bead portions. In the bead portion, the carcass ply cords are interwoven among a plurality of bead wires. By interweaving the carcass ply cords among the bead wires, the contact area of the bead wires and carcass cords is increased, and the interlocking of the carcass ply in the bead portion of the tire is also increased. Preferably, the carcass ply cords are interwoven such that the first end of the carcass ply follows a zigzag path.

In one aspect of the tire, the bead wires are circumferentially oriented and form at least two radially extending columns of bead wires. The bead wires in one radially extending column are radially offset from the bead wires in the adjacent radially extending column.

In another aspect of the tire, the radially extending columns of bead wires are axially overlapping. The axial overlap distance x of the columns of bead wires is 10 to 100% of the bead wire diameter $d_B$.

In another aspect, the bead wires in each column are spaced by a distance z equivalent to $z \geq 2d_C + 0.5d_B$ wherein $d_C$ is the diameter of the carcass ply cords and $d_B$ is the diameter of the bead wires.

In another aspect, the first end of the carcass ply is radially inward of the bead wires.

The tire may have a second carcass ply. The second carcass ply has a first end and a second end, with the first end being located a bead portion of the tire and may be interwoven among the plurality of circumferentially oriented bead wires. When the second ply is interwoven among the bead wires, the first and second carcass plies follow opposing zig-zag paths, encompassing some bead wires between the carcass plies.

One of the bead portions may have a third column of radially extending bead wires. The bead wires in the third column may be radially offset from the bead wires in the second column. Alternatively, the third column may be axially and radially aligned with the bead wires in the other columns. The third column may also have a radial height less than the other columns.

DEFINITIONS

The following definitions are controlling for the disclosed invention.

"Axial" and "axially" are used herein to refer to lines or directions that are parallel to the axis of rotation of the tire.

"Bead portion" means that part of the tire comprising tensile members, reinforcing ply cords and shaped, with or without other reinforcement elements such as flippers, chippers, apexes, toe guards and chafers, to fit the design rim. The radially inner beads are associated with holding the tire to the wheel rim.

"Carcass" means the tire structure apart from the belt structure, tread, undertread, and sidewall rubber over the plies, but including the beads.

"Cord" means a reinforcement strands of which the plies and beads of the tire are comprised. A cord is typically formed from a plurality of bundles or strands of grouped filaments of a high modulus material, but may also be a monofilament.

"Gauge" refers to either the diameter of a cord used anywhere in a tire or the thickness of a treatment on an individual cord or multiple cords to form a ply.

"Inner" means toward the inside of the tire.

"Inner liner" means the layer or layers of elastomer or other material that form the inside surface of a tubeless tire and that contain the inflating fluid within the tire.

"Lateral" means an axial direction.

"Merged cords" mean different materials twisted together to form a cord.

"Outer" means toward the tire's exterior.

"Ply," unless otherwise specified, means a plurality of rubber-coated cords for reinforcing a particular region of the tire. "Carcass ply" means a plurality of rubber-coated cords for reinforcing the carcass.

"Radial" and "radially" mean directions radially toward or away from the axis of rotation of the tire.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
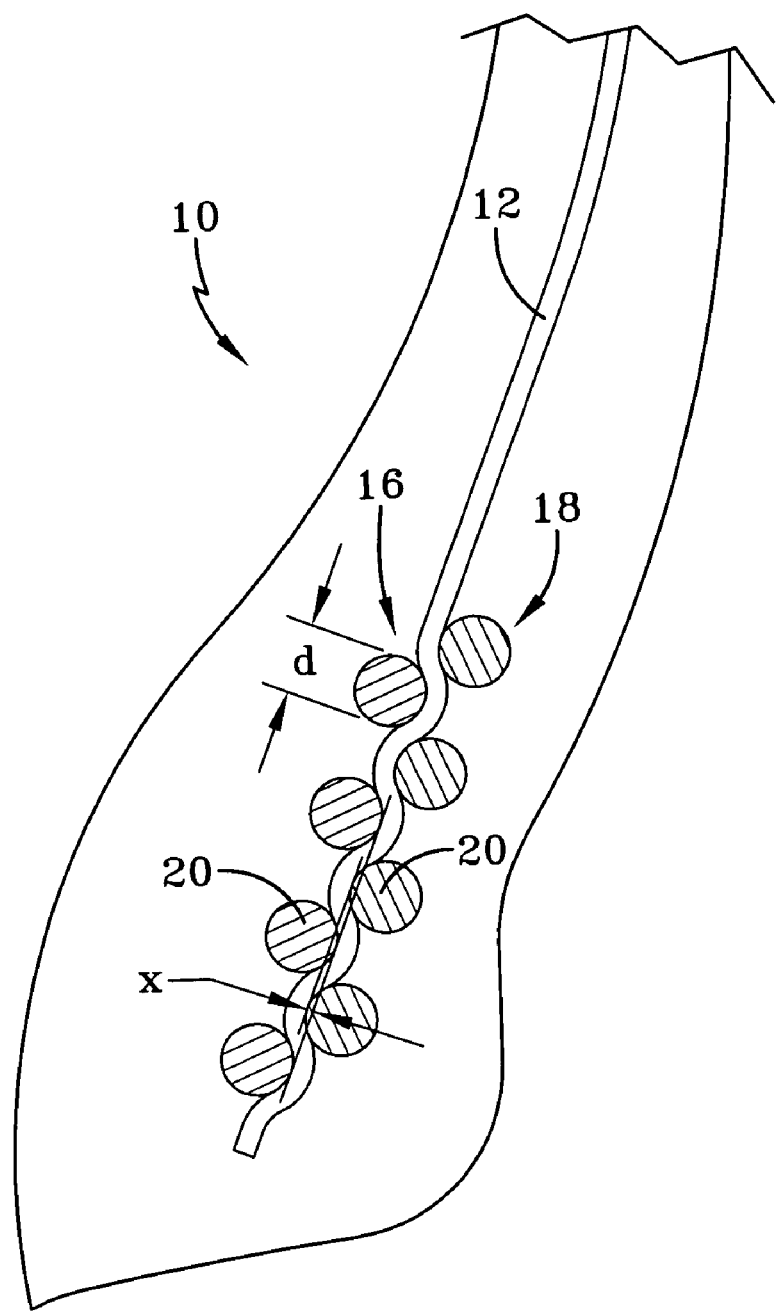
FIG. 1 is a cross section view of a tire bead portion.

FIG. 1 illustrates a bead portion 10 of a cured tire in accordance with the present invention. The carcass ply 12 is formed by cords 14 that are oriented radially in the sidewalls. The carcass cords 14 are wound continuously between a first radially inward end and at least a radially outer location. One method of cord placement and how the cords may be placed in the tire is disclosed in commonly assigned U.S. patent application "Method and Apparatus for Manufacturing Carcass Plies for a Tire," Ser. No. 10/365,374, filed Feb. 11, 2003.

The tire is formed with the conventional tire elements of opposing sidewalls, a tread extending between the sidewalls, a belt package located below the tread, and a pair of opposing bead portions 10 located radially inward of the sidewalls. Other than the bead portion configuration disclosed herein, the above tire elements may be of any conventional design.

As shown in FIG. 1, at the radially inner end of the carcass ply 12, in the bead portion 10 of the tire after the tire has been cured, the carcass cords 14 are interwoven between two bead columns 16, 18. Each bead column 16, 18 has at least three bead circumferentially spaced bead wires 20. A "column" of bead wires 20 is determined by all the wires 20 being on one side of the carcass ply 12. The bead wires 20 in each column 16, 18 are circumferentially offset from the wires 20 in the adjacent column 18, 16. To interlock the carcass cords 14, the bead wires 20 in each column 16, 18 axially overlap the bead wires 20 in the adjacent column 18, 16. The carcass cords 14 are interwoven about the bead wires 20 in such a manner as to create a zigzag path about the circumferentially offset and axially overlapping bead wires 20. The zigzag ply path changes direction at least four times as the ply 12 is interwoven among the bead wires 20.

The bead wires 20 are formed of any traditional and/or conventional bead wire materials. The wires 20 may be monofilaments or bunched cords. The material used to form the monofilaments or bunched cords may be aramid, steel, carbon fiber, or any other high tensile material. The wires 20 are skim coated to initially provide the wires 20 with sufficient tack to maintain placement of the wires 20 during building of the tire and to later provide the wires 20 with adhesion properties during curing of the tire. The thickness of the skim coating is nominal in comparison to the bead wire diameter $d_B$. The diameter $d_B$ of the bead wires 20 is determined by the necessary strength of the bead region 10. The diameter $d_B$ of all the wires may be the identical or may different within one column 16 or 20 or differ from one column to the other column. For simplified manufacturing, explained further herein, the diameter $d_B$ of all the wires in each column is identical.

The carcass cords 14 are formed of any traditional or conventional wire materials. The wires may be monofilaments, bunched, or cabled cords. The material used to form the cords 14 may be polyester, nylon, fiberglass, aramid, steel, or carbon fiber. The cords 14 are skim coated to initially provide with sufficient tack to maintain placement of the cords 14 during building of the tire and to later provide the cords 14 with adhesion properties during curing of the tire. The diameter $d_C$ of the cords 14 is determined by the necessary carcass strength of the bead region, and may be greater or less than the diameter $d_B$ of the bead wires 20.

By interweaving the carcass cords 14 about the rows of bead wires 20, the carcass cords 14 are subjected to two types of mechanical interlocking. The first type of interlocking is mechanical in nature due to the geometry of the cord path relative to the bead wire columns. As the carcass ply cords 14 are tensioned due to inflation, ply tension forces act to consolidate the bead configuration (much like a Chinese finger trap) resulting in increased retention of the ply 12 with the bead wires 20. The second type of mechanical interlocking results from the inflation pressure of the tire 10 imparting a force on the bead structure against the wheel rim flange. This force against the inside bead face pushes the columns of bead wires 20 together, further increasing the retention and interlocking of the carcass ply 12 with the bead wires 20. The addition of both types of mechanical interlocking result in a retention of the ply cords 14 to bead material far greater than just the chemical bonding of the surrounding material.

Figure 2:
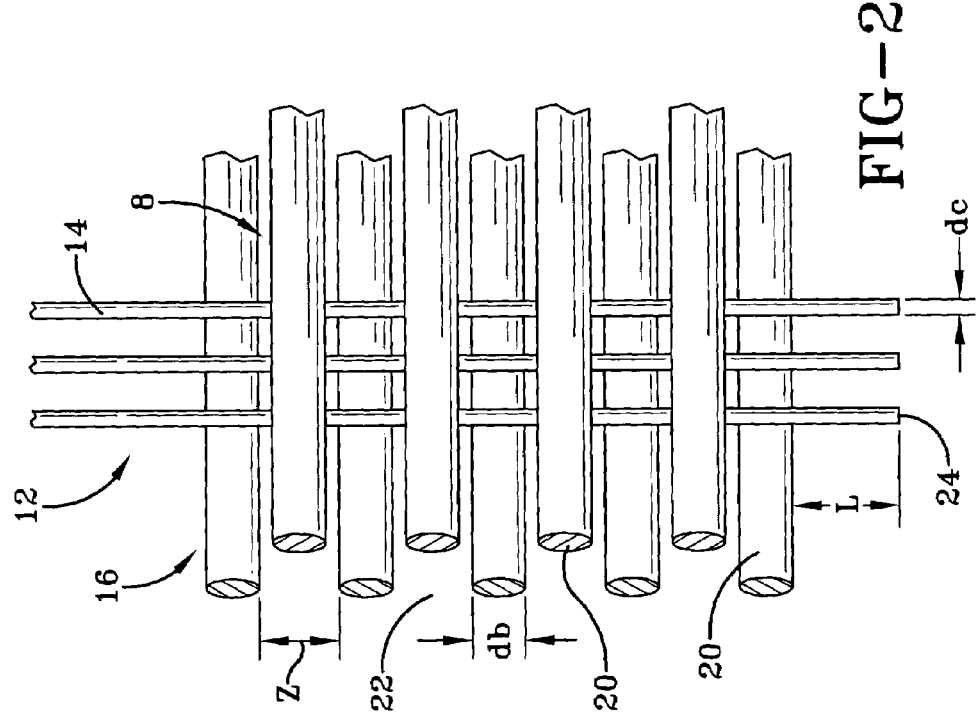
FIG. 2 illustrates the lay up order and spacing of the wires in the bead portion.

The bead region 10 of the tire may be assembled as illustrated in FIG. 2. The bead wires 20 of the first circumferentially extending bead column 16 are laid onto already laid elastomeric layers, the wires extending in the circumferential direction of the tire, parallel to the equatorial plane of the final tire. At a minimum, the elastomeric layers will include an inner liner layer. The individual wires are laid independent of each other, or, to reduce the amount of bead wire splicing or the number of different diameter wire hoops required to form the bead, the bead wire 20 in the single column 16 or 20 is a single wire spirally laid onto the elastomeric layers. When the bead wire 20 is laid spirally, the wires 20 are wire ends as seen in a cross-section of the tire bead portion 10.

A gap 22 with a length z is created between circumferentially adjacent bead wires 20 to permit the bead wires 20 of the next bead column 18 and the carcass cords 14 to interlock with the first column 16. The gap has length z of at least twice the diameter $d_C$ of the carcass cords 14 since the carcass cords 14 are woven into and out of the gap 22. The gap length z is equivalent to the equation:

$z \geq 2d_C + 0.5d_B$.

The carcass cords 14 are then laid, extending radially. The cords 14 are illustrated as inclined at 90° relative to an equatorial plane of the tire, but may be inclined at a lesser angle, down to 75° relative to the equatorial plane. Each individual cord may terminate radially below the bead wires, as illustrated, or may turn upwards to form another carcass cord 14. After the carcass cords 14 are laid, the wires 20 of the next circumferentially extending bead column 18 are laid. Each second column wire 20 is laid in the gap z between adjacent wires 20 of the first column 16. The number of wire ends in the second column 18 in a cross-section of the tire bead portion 10 may or may not be identical to the number of wire ends in the first column 16; there may be more or less wires 20.

At the radially inner end, the carcass cords 14 extend radially below the bead wires 20, creating a tail 24 of length L. As the second bead wire column 18 is formed by the application of the bead wires 20, the carcass cords 14 are forced into the gap 22. As each bead wire 20 is applied in the column 18, the carcass cords gradually form the zigzag configuration seen in FIG. 1. The tail length L slowly decreases as the cords 14 are pushed into the gap 22. The final tail length L ideally is less than the bead wire diameter $d_B$.

The amount of tension used during application of the second bead wire column 18, in combination with the gap 22 distance z, will dictate the amount of axial overlap of the bead wires 20 in the adjacent bead columns. There are two different axial overlaps—as determined tangent to the beads in each bead column and as determined parallel to the equatorial plane of the tire.

The first axial overlap x is more easily determined prior to curing, but may be measured post-cure by the following steps: draw a first line through the centerlines of the bead wires 20 in each column 16, 18; draw a second line parallel to the first line, the second line being tangent to the edge of each bead wire 20 where the bead wire 20 contacts the carcass cords 14; and determine the overlap of the second lines for each bead column 16, 18. This axial overlap may be referred to as column axial overlap.

The second type of axial overlap, as determined parallel to the equatorial plane of the tire, may be referred to as bead wire overlap. This overlap is measured by the following steps: draw a first line tangent to a single bead wire 20 in the axially inner bead column 16 where the bead wire 20 contacts the carcass cord 14, the first line being parallel to the equatorial plane of the tire; draw a second line tangent to the bead wire 20 radially inward of the first bead wire 20 but in the other bead column 20, the second line being parallel to the equatorial plane of the tire; determine the overlap amount of the first and second lines, the overlap measurement should be transverse to the equatorial plane of the tire.

The column axial overlap x is preferably in the range of 5 to 100 percent of the bead wire diameter $d_B$. The bead wire overlap is partially dictated by the inclination angle of the two bead columns, the inclination angle of the bead columns varying from 5° to 50° relative to the radial direction of the tire.

Figure 3:
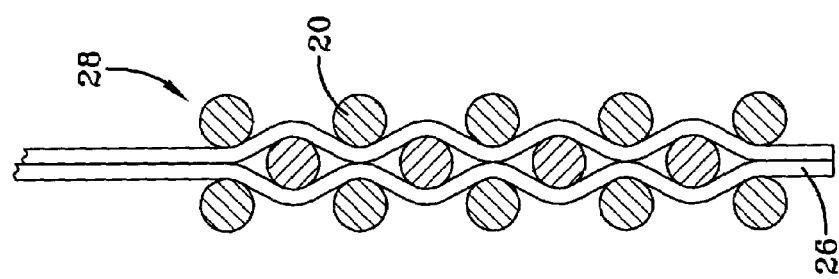
FIGS. 3–6 are alternative bead wire and carcass ply configurations.

In the tire bead portion of FIG. 3, a two ply tire bead portion is illustrated. A second carcass ply 26 is laid axially outward of the second bead column 18. The second carcass ply also follows a zigzag configuration about the second bead column 18. The zigzag path of the second carcass ply 26 opposes the zigzag path of the first carcass ply 12, encompassing the bead wires 20 of the second column 18 between the plies 12, 26 and the plies 12, 26 contacting each other between wires 20 of the second bead column 18.

A third circumferentially extending bead column 28 may be placed axially outward of the second carcass ply 26 to lock in the second carcass ply 26. The wires 20 of the third column 28 may be identical in formation to the other wires. When wound onto the green tire during formation, the wires 20 are placed in the gaps between the wires 20 of the second bead wire column 18. When placed in this manner, the first and third columns are axially adjacent to the wires 20 of the first column 16, and radially offset from the wires 20 of the second column 18.

Figure 4:
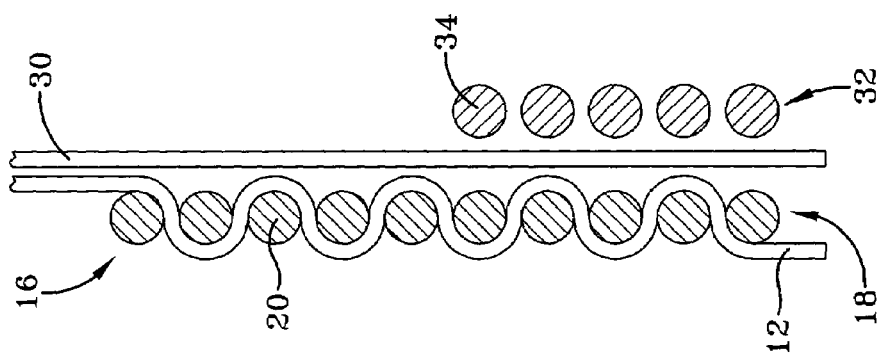

FIG. 4 shows an alternative bead region construction. The axial overlap x of the wires 20 in the two overlapping bead wire columns 16, 18 is at a maximum. A second carcass ply 30 is applied axially outward of the second column 18. The second ply 30 follows a smooth line, notwithstanding any manufacturing tolerances. The second ply 30 contacts both the first ply 12 and the wires 20 of the second column 18.

Axially outward of the second ply 30 may be a third column 32 of bead wires 34. The bead wires 34 of the column 32 are radially and axially aligned. The column 32 may have a radial height less than the radial height of the other columns 16, 18. Such a construction is useful when greater strength is desired at the radially inner end of the bead portion. This would be similar to using a traditional bead core wherein the bead core has a base wider than the upper portion of the bead. If a greater base is not desired for the bead region base, the third column 32 may have a radial height similar to the other columns 16, 18. To further tune the strength characteristics of the bead portion, the wires 34 of the third column 32 may differ from the wires 20 of the first and second bead columns 16, 18. The third column 32 of variable height or bead wire properties may also be used in the absence of the second ply 30.

Figure 6:
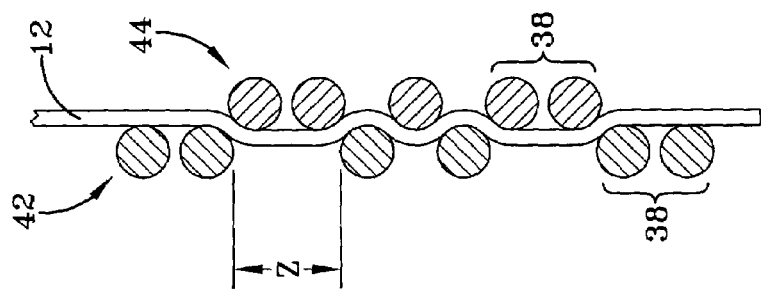
Figure 5:
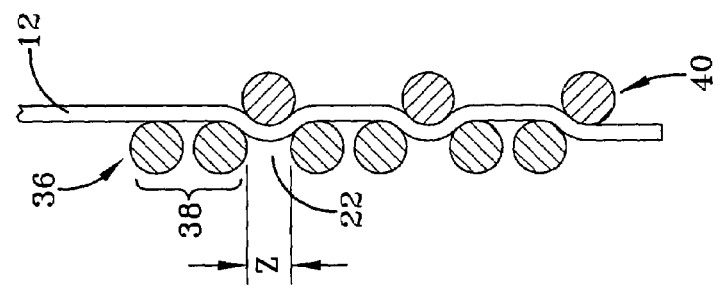

In another aspect of the invention, as seen in FIGS. 5 and 6, the number of directly radially adjacent bead wires 20 in each bead column may vary. In the bead portion of FIG. 5, the first bead column 36 is defined by spaced pairs 38 of bead wires 20. The wires 20 of the second column 40 are singe wires placed in the gap 22. The second column 40 may also comprise pairs of bead wires similar to the first column 36, in which case, the gap 22 will be great enough to accommodate the overlap wires of the second column 40.

In the bead portion of FIG. 6, the wires in each column 42, 44 are a mix of single wires and wire pairs 38. The wire pairs 28 are located at the radially inner and outer ends of the bead portion, with the single wires centered therebetween. However, this configuration may be varied depending on the desired bead characteristics.

For larger sized or heavy duty tires, such as aircraft tires, large truck tires such as drive or steer tires, off-the-road tires, agricultural tires, mining tiers, etc, the exact bead portion construction, including the number of carcass plies and how they are applied as well as the number of bead columns and the number of bead wires in a column, may vary. It is within the scope of this invention to vary the number and placement of carcass plies so long as there is a single carcass ply that is interwoven between a plurality of bead wires. For example, meant by way of illustration only, and not limiting the invention, a pair of adjacent carcass cords may be collectively woven as a single cord in a zigzag path about the wires of two bead wire columns. It is also within the scope of the invention to increase the number of bead wire columns, vary the number of wires in a column, or vary the diameter of the wires.

What is claimed is:

1. A pneumatic tire comprising a reinforcing carcass ply and opposing bead portions, the carcass ply comprising one or more cords wound continuously between a first end and a second end, wherein the first end of the carcass ply is located in one of the opposing bead portions, and in the one of the opposing bead portions, the carcass ply cords are interwoven among at least two radially extending columns of circumferentially oriented bead wires, the ply cords following a zig-zag path among axially overlapping columns of bead wires, the path changing directions at least four times as the ply is interwoven among the bead wires.

2. The tire of claim 1 wherein the bead wires in one radially extending column are radially offset from the bead wires in the adjacent radially extending column.

3. The tire of claim 1 wherein the overlap distance x of the bead wires is 5 to 100% of the bead wire diameter $d_B$.

4. The tire of claim 1 wherein the bead wires in each column are spaced by a distance z equivalent to $z \geq 2d_c + 0.5d_B$ wherein $d_C$ is the diameter of the carcass ply cords and $d_B$ is the diameter of the bead wires.

5. The tire of claim 1 wherein the first end of the carcass ply is radially inward of the bead wires.

6. The tire of claim 1, the tire further comprising a second carcass ply, the second carcass ply having a first end and a second end, the first end being located in the one of the opposing bead portions and being interwoven among the at least two radially extending columns of circumferentially oriented bead wires.

7. The tire of claim 6 wherein in the region of the radially inward first ends of the first and second carcass ply, the carcass plies follow opposing zig-zag paths, encompassing bead wires between the carcass plies.

8. The tire of claim 1 wherein the at least two radially extending columns of circumferentially oriented bead wires form at least three radially extending columns of bead wires.

9. The tire of claim 8 wherein the bead wires in the second radially extending column of bead wires are radially offset from the wires in the first and third radially extending columns of bead wires.

10. The tire of claim 8 wherein the bead wires of the first and third radially extending column are axially and radially aligned.

11. The tire of claim 1 wherein the circumferentially oriented bead wires have either a monofilament or bunched cord construction.

12. The tire of claim 1 wherein the reinforcing elements of the carcass ply are selected from the group consisting of polyester, nylon, fiberglass, aramid, steel, and carbon fiber.

* * * * *